Figure 1:
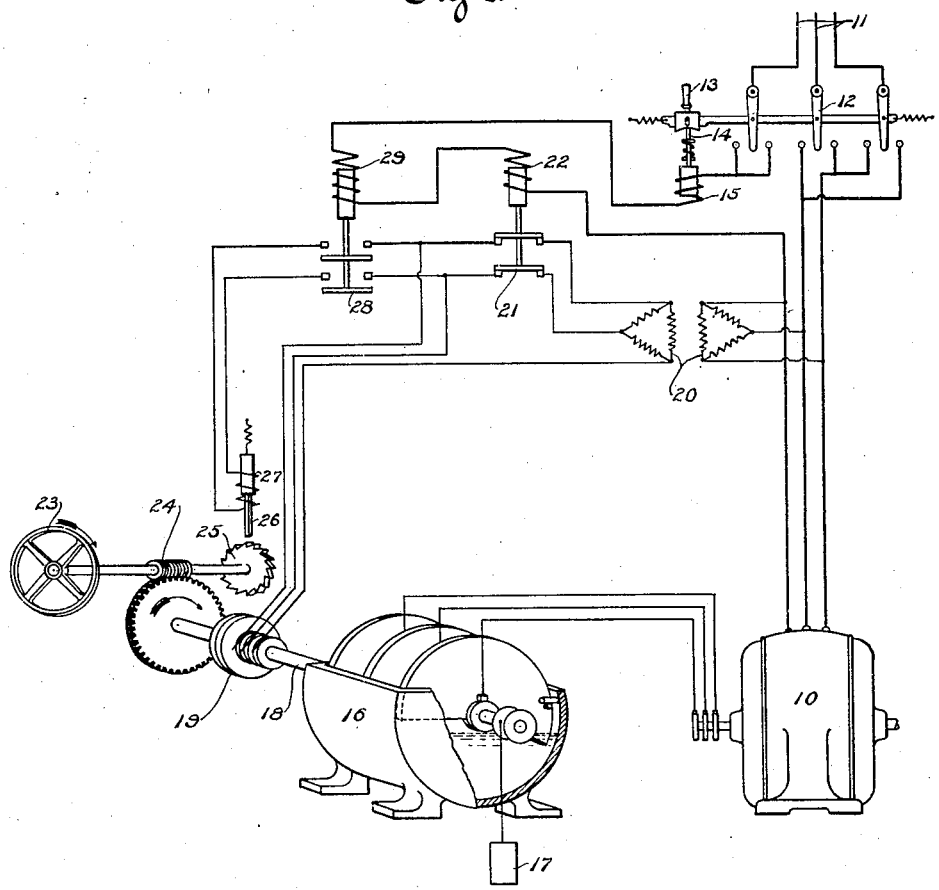

H. A. STEEN.
ELECTRIC CONTROL SYSTEM.
APPLICATION FILED NOV. 2, 1910.

1,100,407.

Patented June 16, 1914.
2 SHEETS—SHEET 1.

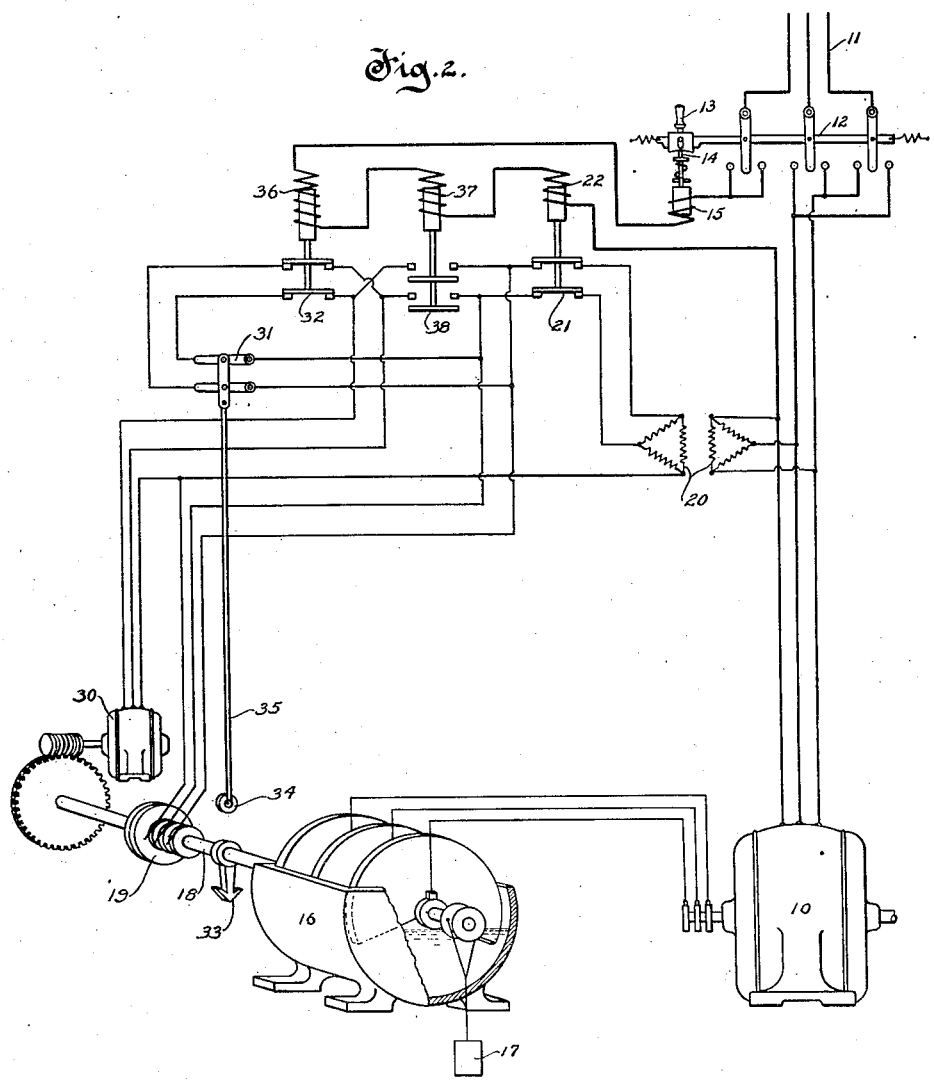

UNITED STATES PATENT OFFICE.

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

ELECTRIC CONTROL SYSTEM.

1,100,407.

Specification of Letters Patent.  Patented June 16, 1914.

Application filed November 2, 1910. Serial No. 590,294.

*To all whom it may concern:*

Be it known that I, HALFDAN A. STEEN, a subject of the King of Norway, residing at Milwaukee, in the county of Milwaukee and State of Wisconsin, have invented certain new and useful Improvements in Electric Control Systems, of which the following is a full, clear, and exact specification.

My invention relates to electric control systems.

In operating translating devices, such as electric motors, the controlling apparatus is sometimes moved too rapidly, so that excessive currents are produced. Various safety devices have been proposed for stopping the current-increasing movement of the control apparatus when the current rises too high. These devices have been of great service, but they are not always adequate; for under some conditions, as because of an increase in the mechanical load on a motor, the current may be increased without change in the control apparatus.

It is the object of my present invention to furnish adequate protection for translating devices, and particularly for electric motors, under all circumstances. Considering motors specifically, this is done by automatically causing current-decreasing operation of the controlling apparatus when the motor current exceeds a predetermined value, current-increasing movement of the controlling apparatus preferably being stopped at a lower predetermined value of such current. This current-decreasing operation may be gradual or sudden, as desired; and may be obtained by biasing the controlling mechanism to minimum current position, and connecting it to the operating mechanism, whether operated by hand or by power, by a clutch which is opened when the motor current reaches the higher predetermined value. The clutch may be of any suitable kind, but is preferably of the electromagnetic type, its energizing circuit being taken off from the main motor circuit on the motor side of the main motor switch. With this arrangement the opening of the main motor switch causes the automatic return of the controlling device to minimum current position. The main motor switch, which may be a reversing switch if desired, is preferably arranged to open automatically if the motor current exceeds a still higher predetermined value. In some cases it may be desirable to provide for both a gradual and a sudden current-decreasing movement of the controlling apparatus, the former being obtained automatically at a somewhat lower predetermined value of motor current than is the latter. This double provision for current-decreasing movement is especially applicable to those cases where the controlling apparatus is power-operated, in which case four steps of protection, at successively higher values of the motor current, may be obtained; first, a stopping of the current-increasing movement of the controller, as by shutting off the power for the controller-operating means; second, a gradual current-decreasing movement of the controller, as by supplying power to the controller-operating means to produce a reverse movement thereof; third, a sudden current-decreasing movement of the controller, as by deënergizing an electromagnetic clutch between the controller and its operating means; and fourth, an automatic disconnection of the motor from the supply circuit, as by the opening of the main motor switch.

My invention is applicable to control systems of all classes, but by way of illustration I have shown it as applied to the control of wound rotor induction motors. The controller proper, in the case illustrated, is a water rheostat, though obviously any desired form of controller may be used.

The various novel features of my invention will appear from the description and drawings, and will be particularly pointed out in the claims.

Figure 1 is a diagram showing my invention as applied to a manually operated control system; and Fig. 2 is a similar diagram showing my invention as applied to a power-operated control system.

The motor 10 is the motor to be controlled. It is shown as a three phase induction motor of the wound rotor type. The primary of this motor may be connected to the mains 11 by a reversing switch 12, which is biased to open position but may be moved to either closed position by a handle 13. When in either closed position, the switch 12 is locked in such position by means of a latch 14, which may be released by lifting the handle 13 or upon sufficient current in an overload coil 15. The secondary circuit of the motor 10 is connected to a suitable resistance device, here shown as a water rheostat 16, which is biased, as by a weight 17, to maximum resistance position. The resistance of the rheostat 16 is varied by rotating its shaft 18, which is connected to the operating mechanism by a suitable electromagnetic clutch 19. The energizing windings of this clutch 19 are supplied from a potential transformer 20 connected across the motor leads on the motor side of the switch 12, so that upon the opening of the switch 12 or if the voltage impressed on the motor falls below a predetermined value the clutch 19 is deënergized to allow the weight 17 to return the rheostat to maximum resistance position. In the circuit of the clutch 19 is a normally closed switch 21, which may be opened by a solenoid 22 responsive to a motor current of a predetermined value, preferably somewhat less than that required for the operation of the solenoid 15.

The operating mechanism for the rheostat 16 may be operated either by hand or by power. In the arrangement shown in Fig. 1 it is operated by a hand wheel 23 driving one part of the clutch 19 through suitable mechanism, such as a worm gear 24. On the shaft of the hand wheel 23 is a ratchet wheel 25, with which a latch 26 may be moved into engagement by a solenoid 27 to stop the forward or current-increasing movement of the hand wheel 23. The latch 26 and the teeth of the wheel 25 are preferably so shaped that while their engagement prevents forward movement of the hand wheel 23 it does not prevent backward or current-decreasing movement thereof. The solenoid 27 may be supplied from the transformer 20, and its circuit is controlled by a normally open switch 28, which may be closed by a solenoid 29 responsive to a motor current somewhat less than that which actuates the solenoid 22.

The operation of the system shown in Fig. 1 is as follows: The switch 12 is closed to the proper position to obtain the desired direction of rotation of the motor 10. At this time the rheostat is necessarily in maximum resistance position, because until the closing of the switch 12 the clutch 19 has been deënergized and the weight 17 has maintained the rheostat in such position. The windings of the clutch 19, as well as those of the motor 10, being energized upon the closing of the switch 12, the hand wheel 23 may be moved to decrease the resistance of the rheostat 16. In the arrangement shown this is done by immersing the plates of the rheostat 16 more deeply into the liquid thereof. Should the hand wheel be moved forward too rapidly, thus raising the motor current beyond a predetermined value, the solenoid 29 closes the switch 28, whereupon the solenoid 27 moves the latch 26 into engagement with one of the teeth of the wheel 25 to stop further forward movement of the hand wheel 23 and the rheostat; backward movement thereof is permitted, however. If the motor speeds up sufficiently to reduce the motor current below such predetermined value, the solenoid 29 allows the switch 28 to fall to deënergize the solenoid 27 and release the latch 26, whereupon the forward movement of the rheostat may be continued. However, if the motor current is increased instead of being decreased, as because of an increased mechanical load on the motor and a consequent slowing down instead of a speeding up of the motor, and exceeds a higher predetermined value, the solenoid 22 is energized sufficiently to open the switch 21 to deënergize the clutch 19, whereupon the weight 17 immediately returns the rheostat to maximum resistance position. This should at once reduce the motor current below the value for which the solenoid 29 is set, for which reason the opening of the switch 21 may also open the circuit of the solenoid 27, as shown; however, it may sometimes be desirable to have the circuit of the solenoid 27 independent of the switch 21. If the return of the rheostat 16 to maximum resistance position does not reduce the motor current as it should, as perhaps because of the short circuit in the motor windings, and the motor current exceeds a third and still higher predetermined value, the solenoid 15 releases the latch 14 and allows the switch 12 to open automatically, thus disconnecting the motor entirely from the supply circuit. With the arrangement shown in Fig. 1, three steps of protection are thus provided.

In the arrangement shown in Fig. 2 the rheostat is actuated by power-operated mechanism. This power-operated mechanism in this case consists of an electric motor 30, here shown as of the squirrel cage type. This motor is also preferably supplied from the transformer 20, so that the motor can only be energized when the switch 12 is closed. The circuit of the motor 30 is normally closed through the switches 31 and 32 in series, so that when the switch 12 is closed the motor 30 will operate in one direction or the other, depending upon which way the switch 12 is closed. Its operation in either direction produces a resistance-diminishing movement of the rheostat 16 from maximum resistance position. Unless the motor current exceeds a predetermined value, this movement continues until the cam 33 on the rheostat shaft 18 strikes the roller 34 and operates it and the rod 35 to open the switch 31. This occurs when the rheostat reaches minimum resistance position, the opening of the switch 31 then causing the motor 30 to stop. However, if during this resistance-diminishing movement of the rheostat 16 the motor current exceeds a predetermined value, a solenoid 36 is energized sufficiently strongly to open the switch 32, thus stopping such resistance-diminishing movement of the motor 30 and the rheostat 16. The switch 32 will remain open, maintaining the circuit of the motor 30 broken, as long as the motor current exceeds such predetermined value, but will close to cause the motor 30 to continue its resistance-diminishing movement as soon as the motor currents falls below such value. If for any reason the motor current does not decrease after the switch 32 has been opened, but increases to a second and higher predetermined value, the solenoid 37 closes a normally open switch 38 to complete the circuits of the motor 30 for reverse rotation, whereupon the motor 30 operates the rheostat 16 to increase the resistance thereof and diminish the current taken by the motor. This current-diminishing movement of the rheostat 16 is a gradual one. If for any reason the motor current rises still higher, and exceeds a third predetermined value, the solenoid 22 opens the switch 21 to deenergize the clutch 19, whereupon the weight 17 moves the rheostat 16 suddenly to maximum resistance position. Since any movement of the motor 30 is useless while the clutch 19 is deënergized, the opening of the switch 21 also preferably opens the circuit of such motor. The results produced by the opening of the switch 21 will reduce the main motor current, in all normal cases, below the predetermined value to which the solenoid 36 is responsive, but in some abnormal cases, as when there is a short-circuit in the motor windings, this will not occur. If it does not, and the motor current rises beyond a fourth and still higher predetermined value, the solenoid 15 releases the latch 14 and allows the switch 12 to open to disconnect the motor 10 from the supply circuit. This deënergizes all windings, whether solenoid, clutch, or motor windings, of the system. In the arrangement shown in Fig. 2 there are thus four steps of protection. The switches 32, 38, and 21 are shown all separate and all operated by separate solenoids; but this is merely by way of illustration. In some cases, the actuating solenoids of these switches, or of some of them, and indeed the switches themselves, may be combined.

The arrangements shown, it is believed furnish adequate protection for all cases which may arise. In many cases, however, some of the protective steps may be omitted, the systems being modified accordingly in a manner sufficiently obvious.

Many modifications may be made in the precise arrangements shown and described, and in the following claims I aim to cover all schemes which come within the spirit and scope of my invention.

What I claim as new is:

1. In combination, a translating device, a controller therefor, means for starting a current-increasing movement of said controller, means for stopping the current-increasing movement of such controller when the current taken by the translating device exceeds a predetermined value, and means for causing a current-decreasing movement of the controller when the current taken by the translating device exceeds a higher predetermined value.

2. In combination, a translating device, a controller therefor, means for moving said controller gradually in a direction to increase the current in the translating device, means for stopping such movement when such current exceeds a predetermined value, and means for causing a sudden movement of the controller in the reverse direction when such current exceeds a higher predetermined value.

3. In combination, a translating device, a controller therefor, means for starting a current-increasing movement of said controller, means for causing a stopping of the current-increasing movement of such controller when the current taken by the translating device exceeds a predetermined value, means for causing a reverse movement of the controller when such current exceeds a higher predetermined value, and means for opening the circuit of the translating device when the current taken thereby exceeds a still higher predetermined value.

4. In combination, a translating device, a controller therefor, means for moving the controller from an initial position to increase the current taken by the translating device, means for stopping such movement of the controller when such current exceeds a predetermined value, means for causing the controller to return suddenly to its initial position when such current exceeds a higher predetermined value, and means for opening the circuit of the translating device when such current exceeds a still higher predetermined value.

5. In combination, a translating device, a controller therefor, said controller being biased to an initial position, operating mechanism for the controller, a clutch for connecting the operating mechanism to the controller, means for stopping the movement of the controller away from its initial position by said operating mechanism when the current taken by the translating device exceeds a predetermined value, and means for causing the opening of said clutch when the current taken by said translating device exceeds a higher predetermined value.

6. In combination, a translating device, a controller therefor, said controller being biased to minimum current position, operating mechanism for the controller, an electromagnetic clutch for connecting said operating mechanism to said controller, means for causing the stopping of the movement of said controller away from minimum current position by said operating mechanism when the current taken by the translating device exceeds a predetermined value, and means for causing the deënergization of said clutch when the current taken by the translating device exceeds a higher predetermined value.

7. In combination, a translating device, a switch in the supply circuit thereof, a controller for said translating device, means for producing a current-increasing movement of said controller when the current taken by the translating device is below a predetermined value, for causing a gradual current-decreasing movement of said controller when such current exceeds a predetermined value, and for causing a sudden current-decreasing movement of the controller when such current exceeds a higher predetermined value, and means for causing the opening of said switch when the current taken by the translating device exceeds a still higher predetermined value.

8. In combination, a translating device, a controller for said translating device, and means for producing a current-increasing movement of said controller when the current taken by the translating device is below a predetermined value, for causing a gradual current-decreasing movement of said controller when such current exceeds a predetermined value, and for causing a sudden current-decreasing movement of the controller when the current taken by the translating device exceeds a higher predetermined value.

9. In combination, a translating device, a switch in the supply circuit thereof, a controller for the translating device, means for producing a current-increasing movement of said controller when the current taken by said translating device is below a predetermined value, means for stopping such movement when such current exceeds such predetermined value, means for causing a gradual current-decreasing movement of the controller when such current exceeds a higher predetermined value, means for causing a sudden current-decreasing movement of the controller when such current exceeds a still higher predetermined value, and means for causing the opening of said switch when such current exceeds a fourth predetermined value.

10. In combination, a translating device, a controller for the translating device, means for producing current-increasing movement of said controller when the current taken by said translating device is below a predetermined value, means for stopping such movement when such current exceeds such predetermined value, means for causing a gradual current-decreasing movement of the controller when such current exceeds a higher predetermined value, and means for causing a sudden current-decreasing movement of the controller when such current exceeds a still higher predetermined value.

11. In combination, a motor, a starting controller therefor, power-operated means for operating said starting controller and normally operating it to increase the motor speed, means for disconnecting said power operated means from said controller in response to abnormal circuit conditions without materially affecting the operation of said motor, and means for causing a reversal of the direction in which said power-operated means operates said controller if the current taken by the motor exceeds a predetermined value.

12. In combination, a motor, a starting controller therefor, a pilot motor for operating said controller, said pilot motor normally operating the controller to increase the speed of the main motor, and means for reversing the pilot motor when the current taken by the main motor exceeds a predetermined value and for disconnecting said controller from said pilot motor in response to abnormal circuit conditions without causing the main motor to discontinue operation.

13. In combination, a motor, a starting controller therefor, power-operated means for operating said controller, a clutch for connecting said power-operated means to said controller, and means for reversing the direction in which said power-operated means operates said controller when the current taken by the motor exceeds a predetermined value and for causing the opening of said clutch when such current exceeds a higher predetermined value.

14. In combination, a motor, a starting controller therefor, power-operated means for operating said controller, a clutch through which said operating mechanism operates said controller, and means for stopping the operation of said controller by said operating mechanism when the current taken by the motor exceeds a predetermined value and for causing the opening of said clutch when the current taken by the motor exceeds a higher predetermined value.

15. In combination, a motor, a starting controller therefor including a resistance circuit, means for operating said controller, a clutch through which the controller is operated by said means, and means independent of said resistance circuit for causing the opening of said clutch while permitting the operation of said motor when the current taken by the motor exceeds a predetermined value.

16. In combination, a motor, a starting controller therefor, said controller being biased to minimum current position, means for moving said controller away from such position, a clutch through which said means operates said controller, and means for stopping the movement of said controller by said first mentioned means when the current taken by the motor exceeds a predetermined value and for causing the opening of said clutch when such current exceeds a higher predetermined value.

17. In combination, a motor, a starting controller therefor, said controller being biased to minimum current position, power-operated means for moving said controller away from such position, a clutch through which the power-operated means operates said controller, means for reversing the direction in which said power-operated means operates the controller when the current taken by the motor exceeds a predetermined value, and means for causing the opening of said clutch when such current exceeds a higher predetermined value.

18. In combination, a motor, a controller therefor including a resistance circuit, a clutch for connecting said controller to a source of power, and means independent of said resistance circuit for causing the opening of said clutch without materially affecting the operation of said motor when the current taken by the motor exceeds a predetermined value 19. In combination, a motor, a starting controller therefor including a resistance circuit, said controller being biased to minimum current position, a clutch for connecting said controller to a source of power to move the controller away from such position, and means independent of said resistance circuit for causing the opening of said clutch without causing said motor to discontinue operation when the current taken by the motor exceeds a predetermined value.

20. In combination, a motor, a starting controller therefor, said controller being biased to an initial position, a clutch for connecting said controller to a source of power to move the controller away from such position, means for stopping such movement of said controller when the current taken by the motor exceeds a predetermined value, and means for causing the opening of said clutch when such current exceeds a higher predetermined value.

21. In combination, a motor, a starting controller therefor, said controller being biased to an initial position, a clutch for connecting said controller to a source of power to move such controller away from such position, and means for reversing the direction in which said controller is operated when the current taken by the motor exceeds a predetermined value, and for causing the opening of said clutch when such current exceeds a higher predetermined value.

22. In combination, a motor, a controller therefor, power-operated means for moving said controller, a clutch through which said power-operated means operates said controller, means for causing the opening of said clutch when the current taken by the motor exceeds a predetermined value, and means for causing a reversal of the direction in which said power-operated means operates the controller when such current exceeds another predetermined value.

23. In combination, a motor, a controller therefor, a clutch for connecting said controller to a source of power, and means for causing the opening of said clutch when the current taken by the motor exceeds one predetermined value and for causing a reversal of the direction in which the controller is operated when such current exceeds a different predetermined value.

24. In combination, a motor, a starting controller therefor, power-operated means for operating said starting controller and normally operating it to increase the motor speed, means for stopping such operation of the controller by said power-operated means when the controller has reached maximum speed position, and means for causing a reversal of the direction in which said power-operated means operates said controller if the current taken by the motor exceeds a predetermined value.

25. In combination, a motor, a starting controller therefor, power-operated means for operating said controller and normally operating it in a direction to increase the motor speed, means for stopping the operation of said controller by said power-operated means when either the controller has reached maximum speed position or the current taken by the motor exceeds a predetermined value, and means for reversing the direction in which the power-operated means operates the controller when such current exceeds a higher predetermined value.

26. In combination, a motor, a power-operated starting controller therefor, said controller being operated normally to increase the motor speed, and controlling means for said controller acting to cause a reversal of the direction in which said controller is operated if the current taken by the motor exceeds a predetermined value and to separate said controller from the source of power while permitting said motor to operate if said current exceeds a higher predetermined value.

27. In combination, a motor, a power-operated starting controller therefor, said controller being operated normally to increase the motor speed, means movable with the controller for stopping the operation of said starting controller when it reaches maximum speed position, separate means for causing a reversal of the direction in which said controller is operated if the current taken by the motor exceeds a predetermined value, and means responsive to a higher predetermined value of said current for stopping the operation of said controller.

28. In combination, a main motor, a reversing switch for connecting it to a supply circuit, a controller for the motor, said controller being biased to a middle position from which it is movable in either direction to increase the motor speed, a pilot motor for operating said controller, and an electromagnetic clutch for mechanically connecting said pilot motor and said controller, said pilot motor and said clutch both having windings connected across the main motor circuit on the motor side of the reversing switch.

29. In combination, a translating device, a controller therefor, said controller being biased to an initial position, operating mechanism for the controller, means for connecting the operating mechanism to the controller, means for stopping the movement of the controller away from its initial position by said operating mechanism when the current taken by the translating device exceeds a predetermined value, and means for causing said first mentioned means to become ineffective when the current taken by said translating device exceeds a higher predetermined value.

30. In combination, a translating device, a controller therefor, said controller being biased to a minimum current position, operating mechanism for the controller, means for connecting said operating mechanism to said controller, means for causing the stopping of the movement of said controller away from minimum current position by said operating mechanism when the current taken by the translating device exceeds a predetermined value, and means for causing said first mentioned means to become ineffective when the current taken by the translating device exceeds a higher predetermined value.

31. In combination, a motor, a starting controller therefor, power-operated means for operating said controller, means for connecting said power-operated means to said controller, and means for reversing the direction in which said power-operated means operates said controller when the current taken by the motor exceeds a predetermined value and for causing said connecting means to become ineffective when said current exceeds a higher predetermined value.

32. In combination, a motor, a starting controller therefor, power-operated means for operating said controller, means through which said operating mechanism operates said controller, and means for stopping the operation of said controller by said operating mechanism when the current taken by the motor exceeds a predetermined value and for causing said second mentioned means to become ineffective when the current taken by the motor exceeds a higher predetermined value.

33. In combination, a motor, a starting controller therefor, said controller being biased to a minimum current position, power-operated means for moving said controller away from such position, means through which the power-operated means operates said controller, means for reversing the direction in which said power-operated means operates the controller when the current taken by the motor exceeds a predetermined value, and means for causing said second mentioned means for becoming ineffective when such current exceeds a higher predetermined value.

34. In combination, a motor, a starting controller therefor, said controller being biased to an initial position, means for connecting said controller to a source of power to move the controller away from such position, means for stopping such movement of said controller when the current taken by the motor exceeds a predetermined value, and means for causing said first mentioned means to become ineffective when such current exceeds a higher predetermined value.

35. In combination, a translating device, a controller therefor, said controller being biased to an initial position, operating mechanism for said controller, a clutch for connecting the operating mechanism to said controller, means responsive to abnormal circuit conditions to stop the movement of said controller, and overload responsive means for causing the opening of said clutch when the current taken by said translating device exceeds a predetermined value.

36. In combination, a motor, a starting controller therefor, means for operating said controller, means responsive to abnormal circuit conditions to render said operating means ineffective, a clutch through which the controller is operated by said means, and overload responsive means for causing the opening of said clutch when the current taken by the motor exceeds a predetermined value.

37. In combination, a motor, a starting controller therefor, said controller being biased to minimum current position, means for moving said controller away from such position, means responsive to abnormal circuit conditions to render said means ineffective, a clutch through which said means operates said controller, and overload responsive means for causing the opening of said clutch when the current taken by the motor exceeds a predetermined value.

38. In combination, a motor, a controller therefor, a clutch for connecting said controller to a source of power, means responsive to abnormal circuit conditions to stop said controller while the clutch is effective, and overload responsive means for causing the opening of said clutch when the current taken by the motor exceeds a predetermined value.

39. In combination, a motor, a starting controller therefor, said controller being biased to minimum current position, a clutch for connecting said controller to a source of power to move the controller away from such position, means responsive to abnormal circuit conditions to stop said controller while the clutch is effective, and overload responsive means for causing the opening of said clutch when the current taken by the motor exceeds a predetermined value.

40. In combination, a motor, a starting controller therefor, means for operating said controller, a clutch between said controller and said operating means, and means responsive to abnormal current conditions in the circuit of the motor for actuating said clutch to disconnect said operating means from said controller while permitting the operation of said motor.

41. In combination, a motor, a starting controller therefor, a pilot motor for operating said controller and tending when the main motor is starting to operate the controller to increase the speed of the main motor, and controlling means for said pilot motor responsive to current conditions in the main motor circuit and acting to stop the pilot motor when the current in the main motor circuit exceeds a predetermined value, and to reverse the pilot motor when such current exceeds a higher predetermined value, and to disconnect the pilot motor from the controller without stopping the operation of the main motor.

42. In combination, a motor, a starting controller therefor including a resistance circuit, means for operating said controller, a clutch through which the controller is operated by said means, and means independent of said resistance circuit for rendering said operating means inactive when the current taken by the motor exceeds a predetermined value and for causing the opening of said clutch when said current exceeds a higher predetermined value.

43. In combination, a translating device, a controller therefor, said controller being biased to initial position, operating mechanism for said controller, a clutch for connecting the operating mechanism to said controller, current responsive means for rendering said operating mechanism inactive when the current taken by said translating device exceeds a predetermined value and for actuating said clutch to disconnect said controller from said operating mechanism when said current exceeds a higher predetermined value.

Milwaukee, Wis., Oct. 29, 1910.

In testimony whereof I affix my signature, in the presence of two witnesses.

HALFDAN A. STEEN.

Witnesses:
  GEO. B. SCHLEY,
  CHAS. L. BYRON.

---

It is hereby certified that in Letters Patent No. 1,100,407, granted June 16, 1914, upon the application of Halfdan A. Steen, of Milwaukee, Wisconsin, for an improvement in "Electric Control Systems," an error appears in the printed specification requiring correction as follows: Page 6, line 128, before the word "means" insert the word *moving;* and that the said Letters Patent should be read with this correction therein that the same may conform to the record of the case in the Patent Office.

Signed and sealed this 7th day of July, A. D., 1914.

[SEAL.]

R. F. WHITEHEAD,

*Acting Commissioner of Patents.*